United States Patent
Kubacki

(10) Patent No.: US 12,539,218 B2
(45) Date of Patent: Feb. 3, 2026

(54) TALAR IMPLANT

(71) Applicant: WRIGHT MEDICAL TECHNOLOGY, INC., Memphis, TN (US)

(72) Inventor: Meghan Kubacki, Memphis, TN (US)

(73) Assignee: WRIGHT MEDICAL TECHNOLOGY, INC., Memphis, TN (US)

( * ) Notice: Subject to any disclaimer, the term of this patent is extended or adjusted under 35 U.S.C. 154(b) by 607 days.

(21) Appl. No.: 18/001,942

(22) PCT Filed: Aug. 30, 2021

(86) PCT No.: PCT/US2021/071308
§ 371 (c)(1),
(2) Date: Dec. 15, 2022

(87) PCT Pub. No.: WO2022/094502
PCT Pub. Date: May 5, 2022

(65) Prior Publication Data
US 2023/0225875 A1    Jul. 20, 2023

Related U.S. Application Data

(60) Provisional application No. 63/106,403, filed on Oct. 28, 2020.

(51) Int. Cl.
*A61F 2/42* (2006.01)
*A61F 2/30* (2006.01)

(52) U.S. Cl.
CPC .. *A61F 2/4202* (2013.01); *A61F 2002/30057* (2013.01); *A61F 2002/30383* (2013.01);
(Continued)

(58) Field of Classification Search
CPC ......... A61F 2/4202; A61F 2/42; A61F 2/4207
See application file for complete search history.

(56) References Cited

U.S. PATENT DOCUMENTS 3,839,742 A    10/1974 Link
3,872,519 A    3/1975 Giannestras et al.
(Continued)

FOREIGN PATENT DOCUMENTS

CA    2836651    3/2016
CN    101790353    7/2010
(Continued)

OTHER PUBLICATIONS

Search report issued for European patent application No. 13198280 dated Feb. 5, 2014.
(Continued)

*Primary Examiner* — Marcia L Watkins
(74) *Attorney, Agent, or Firm* — DUANE MORRIS LLP

(57) ABSTRACT

Provided is a total talar replacement prosthesis that has a metallic body shell and a metallic or biologic core, where the metallic body shell includes one or both of a removable calcaneus attachment and a removable navicular attachment. The attachments, when removed, exposes a respective calcaneus-facing surface or a navicular-facing surface that can enhance fusion to the respective bones, calcaneus and/or navicular.

20 Claims, 8 Drawing Sheets

(52) U.S. Cl.
CPC .............. *A61F 2002/30405* (2013.01); *A61F 2002/305* (2013.01); *A61F 2002/30622* (2013.01); *A61F 2002/4207* (2013.01)

(56) References Cited

U.S. PATENT DOCUMENTS

| | | | |
|---|---|---|---|
| 3,886,599 A | 6/1975 | Schlein |
| 3,889,300 A | 6/1975 | Smith |
| 3,896,502 A | 7/1975 | Lennox |
| 3,896,503 A | 7/1975 | Freeman et al. |
| 3,975,778 A | 8/1976 | Newton, III |
| 3,987,500 A | 10/1976 | Schlein |
| 4,021,864 A | 5/1977 | Waugh |
| 4,069,518 A | 1/1978 | Groth, Jr. et al. |
| 4,156,944 A | 6/1979 | Schreiber et al. |
| 4,166,292 A | 9/1979 | Bokros |
| 4,204,284 A | 5/1980 | Koeneman |
| 4,232,404 A | 11/1980 | Samuelson et al. |
| 4,309,778 A | 1/1982 | Buechel et al. |
| 4,470,158 A | 9/1984 | Pappas et al. |
| 4,755,185 A | 7/1988 | Tarr |
| 4,968,316 A | 11/1990 | Hergenroeder |
| 5,041,139 A | 8/1991 | Brånemark |
| 5,312,412 A | 5/1994 | Whipple |
| 5,326,365 A | 7/1994 | Alvine |
| 5,354,300 A | 10/1994 | Goble et al. |
| 5,395,188 A | 3/1995 | Bailey et al. |
| 5,423,825 A | 6/1995 | Levine |
| 5,476,466 A | 12/1995 | Barrette et al. |
| 5,601,563 A | 2/1997 | Burke et al. |
| 5,628,749 A | 5/1997 | Vendrely et al. |
| 5,634,927 A | 6/1997 | Houston et al. |
| 5,667,511 A | 9/1997 | Vendrely et al. |
| 5,674,223 A | 10/1997 | Cipolletti et al. |
| 5,735,904 A | 4/1998 | Pappas |
| 5,766,259 A | 6/1998 | Sammarco |
| 5,776,200 A | 7/1998 | Johnson et al. |
| 5,817,097 A | 10/1998 | Howard et al. |
| 5,824,106 A | 10/1998 | Fournal |
| 5,879,389 A | 3/1999 | Koshino |
| 5,885,299 A | 3/1999 | Winslow et al. |
| 5,888,203 A | 3/1999 | Goldberg |
| 5,897,559 A | 4/1999 | Masini |
| 5,935,132 A | 8/1999 | Bettuchi et al. |
| 6,002,859 A | 12/1999 | DiGioia, III et al. |
| 6,033,405 A | 3/2000 | Winslow et al. |
| 6,053,922 A | 4/2000 | Krause et al. |
| 6,102,952 A | 8/2000 | Koshino |
| 6,183,519 B1 | 2/2001 | Bonnin et al. |
| 6,245,109 B1 | 6/2001 | Mendes et al. |
| 6,342,056 B1 | 1/2002 | Mac-Thiong et al. |
| 6,344,043 B1 | 2/2002 | Pappas |
| 6,409,767 B1 | 6/2002 | Pericéet al. |
| 6,436,146 B1 | 8/2002 | Hassler et al. |
| 6,478,800 B1 | 11/2002 | Fraser et al. |
| 6,520,964 B2 | 2/2003 | Tallarida et al. |
| 6,530,930 B1 | 3/2003 | Marino et al. |
| 6,602,259 B1 | 8/2003 | Masini |
| 6,610,067 B2 | 8/2003 | Tallarida et al. |
| 6,610,095 B1 | 8/2003 | Pope et al. |
| 6,620,168 B1 | 9/2003 | Lombardo et al. |
| 6,645,215 B1 | 11/2003 | McGovern et al. |
| 6,663,669 B1 | 12/2003 | Reiley |
| 6,673,116 B2 | 1/2004 | Reiley |
| 6,679,917 B2 | 1/2004 | Ek |
| 6,719,799 B1 | 4/2004 | Kropf |
| 6,824,567 B2 | 11/2004 | Tornier et al. |
| 6,852,130 B2 | 2/2005 | Keller et al. |
| 6,860,902 B2 | 3/2005 | Reiley |
| 6,863,691 B2 | 3/2005 | Short et al. |
| 6,875,222 B2 | 4/2005 | Long et al. |
| 6,875,236 B2 | 4/2005 | Reiley |
| 6,926,739 B1 | 8/2005 | O'Connor et al. |
| 6,939,380 B2 | 9/2005 | Guzman |
| 6,942,670 B2 | 9/2005 | Heldreth et al. |
| 6,964,663 B2 | 11/2005 | Grant et al. |
| 7,001,394 B2 | 2/2006 | Gundlapalli et al. |
| 7,011,687 B2 | 3/2006 | Deffenbaugh et al. |
| 7,025,790 B2 | 4/2006 | Parks et al. |
| 7,163,541 B2 | 1/2007 | Ek |
| 7,238,190 B2 | 7/2007 | Schon et al. |
| 7,252,684 B2 | 8/2007 | Dearnaley |
| 7,314,488 B2 | 1/2008 | Reiley |
| 7,323,012 B1 | 1/2008 | Stone et al. |
| 7,476,227 B2 | 1/2009 | Tornier et al. |
| 7,481,814 B1 | 1/2009 | Metzger |
| 7,485,147 B2 | 2/2009 | Papps et al. |
| 7,534,246 B2 | 5/2009 | Reiley et al. |
| 7,534,270 B2 | 5/2009 | Ball |
| 7,615,082 B2 | 11/2009 | Naegerl et al. |
| 7,618,421 B2 | 11/2009 | Axelson, Jr. et al. |
| 7,625,409 B2 | 12/2009 | Saltzman et al. |
| 7,641,697 B2 | 1/2010 | Reiley |
| 7,678,151 B2 | 3/2010 | Ek |
| 7,713,305 B2 | 5/2010 | Ek |
| 7,717,920 B2 | 5/2010 | Reiley |
| 7,763,080 B2 | 7/2010 | Southworth |
| 7,803,158 B2 | 9/2010 | Hayden |
| 7,850,698 B2 | 12/2010 | Straszheim-Morley et al. |
| 7,896,883 B2 | 3/2011 | Ek et al. |
| 7,896,885 B2 | 3/2011 | Miniaci et al. |
| 7,909,882 B2 | 3/2011 | Stinnette |
| 7,914,533 B2 | 3/2011 | Nelson et al. |
| 7,963,996 B2 | 6/2011 | Saltzman et al. |
| 8,002,841 B2 | 8/2011 | Hasselman |
| 8,012,217 B2 | 9/2011 | Strzepa et al. |
| 8,034,114 B2 | 10/2011 | Reiley |
| 8,034,115 B2 | 10/2011 | Reiley |
| 8,048,164 B2 | 11/2011 | Reiley |
| 8,110,006 B2 | 2/2012 | Reiley |
| 8,114,091 B2 | 2/2012 | Ratron et al. |
| 8,128,627 B2 | 3/2012 | Justin et al. |
| 8,167,888 B2 | 5/2012 | Steffensmeier |
| 8,172,850 B2 | 5/2012 | McMinn |
| 8,177,841 B2 | 5/2012 | Ek |
| 8,192,434 B2 | 6/2012 | Huebner et al. |
| 8,268,007 B2 | 9/2012 | Barsoum et al. |
| 8,303,667 B2 | 11/2012 | Younger |
| 8,313,492 B2 | 11/2012 | Wong et al. |
| 8,317,797 B2 | 11/2012 | Rasmussen |
| 8,323,346 B2 | 12/2012 | Tepic |
| 8,337,503 B2 | 12/2012 | Lian |
| 8,361,159 B2 | 1/2013 | Ek |
| 8,366,559 B2 | 2/2013 | Papenfuss et al. |
| 8,430,879 B2 | 4/2013 | Stoneburner et al. |
| 8,475,463 B2 | 7/2013 | Lian |
| 8,491,596 B2 | 7/2013 | Long et al. |
| 8,579,980 B2 | 11/2013 | DeLurio et al. |
| 8,715,362 B2 | 5/2014 | Reiley et al. |
| 8,808,303 B2 | 8/2014 | Stemniski et al. |
| 8,911,444 B2 | 12/2014 | Bailey |
| 9,259,250 B2 | 2/2016 | Saravia et al. |
| 9,480,571 B2 | 11/2016 | McGinley et al. |
| 9,492,281 B2 | 11/2016 | Rouyer et al. |
| 9,629,726 B2 | 4/2017 | Reiley et al. |
| 9,629,730 B2 | 4/2017 | Reiley |
| 9,907,561 B2 | 3/2018 | Luna et al. |
| 10,034,678 B2 | 7/2018 | Park et al. |
| 10,039,558 B2 | 8/2018 | Park et al. |
| 10,111,674 B2 | 10/2018 | Crainich et al. |
| 10,136,904 B2 | 11/2018 | McGinley et al. |
| 10,149,687 B2 | 12/2018 | McGinley et al. |
| 10,182,832 B1 | 1/2019 | Saltzman et al. |
| 10,206,688 B2 | 2/2019 | Park et al. |
| 10,213,309 B2 | 2/2019 | Lindsey et al. |
| 10,743,999 B2 | 8/2020 | Reiley |
| 10,940,012 B2 | 3/2021 | Sander et al. |
| 11,013,520 B2 | 5/2021 | Gareiss et al. |
| 2002/0068977 A1 | 6/2002 | Jackson |
| 2002/0082607 A1 | 6/2002 | Heldreth et al. |
| 2002/0133164 A1 | 9/2002 | Williamson |
| 2002/0173853 A1 | 11/2002 | Corl, III et al. |
| 2003/0208280 A1 | 11/2003 | Tohidi |
| 2003/0236522 A1 | 12/2003 | Long et al. |

(56) References Cited

U.S. PATENT DOCUMENTS

| | | |
|---|---|---|
| 2004/0030399 A1 | 2/2004 | Asencio |
| 2004/0039394 A1 | 2/2004 | Conti et al. |
| 2004/0068322 A1 | 4/2004 | Ferree |
| 2004/0167631 A1 | 8/2004 | Luchesi et al. |
| 2004/0186585 A1 | 9/2004 | Feiwell |
| 2004/0193268 A1 | 9/2004 | Hazebrouck |
| 2004/0216259 A1 | 11/2004 | Ponziani |
| 2004/0236431 A1 | 11/2004 | Sekel |
| 2005/0004676 A1 | 1/2005 | Schon et al. |
| 2005/0165408 A1 | 7/2005 | Puno et al. |
| 2005/0192674 A1 | 9/2005 | Ferree |
| 2005/0267481 A1 | 12/2005 | Carl et al. |
| 2006/0009857 A1 | 1/2006 | Gibbs et al. |
| 2006/0020345 A1 | 1/2006 | O'Connor et al. |
| 2006/0036257 A1 | 2/2006 | Steffensmeier |
| 2006/0116679 A1 | 6/2006 | Lutz et al. |
| 2006/0142870 A1 | 6/2006 | Robinson et al. |
| 2006/0229730 A1 | 10/2006 | Railey et al. |
| 2006/0235541 A1 | 10/2006 | Hodorek |
| 2006/0247788 A1 | 11/2006 | Ross |
| 2007/0038303 A1 | 2/2007 | Myerson et al. |
| 2007/0100346 A1 | 5/2007 | Wyss et al. |
| 2007/0112431 A1 | 5/2007 | Kofoed |
| 2007/0162025 A1 | 7/2007 | Tornier et al. |
| 2007/0173944 A1 | 7/2007 | Keller et al. |
| 2007/0173947 A1 | 7/2007 | Ratron |
| 2007/0213830 A1 | 9/2007 | Ammann et al. |
| 2007/0233129 A1 | 10/2007 | Bertagnoli et al. |
| 2007/0276400 A1 | 11/2007 | Moore et al. |
| 2007/0288030 A1 | 12/2007 | Metzger et al. |
| 2008/0015602 A1 | 1/2008 | Axelson |
| 2008/0097617 A1 | 4/2008 | Fellinger et al. |
| 2008/0103603 A1 | 5/2008 | Hintermann |
| 2008/0109081 A1 | 5/2008 | Bao et al. |
| 2008/0195233 A1 | 8/2008 | Ferrari et al. |
| 2008/0215156 A1 | 9/2008 | Duggal et al. |
| 2008/0287954 A1 | 11/2008 | Kunz et al. |
| 2008/0312745 A1 | 12/2008 | Keller et al. |
| 2009/0024131 A1 | 1/2009 | Metzger et al. |
| 2009/0043309 A1 | 2/2009 | Rasmussen |
| 2009/0043310 A1 | 2/2009 | Rasmussen |
| 2009/0054992 A1 | 2/2009 | Landes et al. |
| 2009/0082875 A1 | 3/2009 | Long |
| 2009/0105767 A1 | 4/2009 | Reiley |
| 2009/0105840 A1 | 4/2009 | Reiley |
| 2009/0182433 A1 | 7/2009 | Reiley et al. |
| 2009/0198341 A1 | 8/2009 | Choi et al. |
| 2009/0234360 A1 | 9/2009 | Alexander |
| 2009/0276052 A1 | 11/2009 | Regala et al. |
| 2010/0010493 A1 | 1/2010 | Dower |
| 2010/0023066 A1 | 1/2010 | Long et al. |
| 2010/0023126 A1 | 1/2010 | Grotz |
| 2010/0057216 A1 | 3/2010 | Gannoe et al. |
| 2010/0069910 A1 | 3/2010 | Hasselman |
| 2010/0198355 A1 | 8/2010 | Kofoed et al. |
| 2010/0212138 A1 | 8/2010 | Carroll et al. |
| 2010/0241237 A1 | 9/2010 | Pappas |
| 2010/0256773 A1 | 10/2010 | Thijs et al. |
| 2010/0262150 A1 | 10/2010 | Lian |
| 2010/0305572 A1 | 12/2010 | Saltzman et al. |
| 2010/0318088 A1 | 12/2010 | Warne et al. |
| 2010/0331984 A1 | 12/2010 | Barsoum et al. |
| 2011/0029090 A1 | 2/2011 | Zannis et al. |
| 2011/0035018 A1 | 2/2011 | Deffenbaugh et al. |
| 2011/0035019 A1 | 2/2011 | Goswami et al. |
| 2011/0071645 A1 | 3/2011 | Bojarski et al. |
| 2011/0106268 A1 | 5/2011 | Deffenbaugh et al. |
| 2011/0112542 A1 | 5/2011 | Gross |
| 2011/0125200 A1 | 5/2011 | Hanson et al. |
| 2011/0125275 A1 | 5/2011 | Lipman et al. |
| 2011/0125284 A1 | 5/2011 | Gabbrielli et al. |
| 2011/0152868 A1 | 6/2011 | Kourtis et al. |
| 2011/0152869 A1 | 6/2011 | Ek et al. |
| 2011/0166608 A1 | 7/2011 | Duggal et al. |
| 2011/0190829 A1 | 8/2011 | Duggal et al. |
| 2011/0218542 A1 | 9/2011 | Lian |
| 2011/0245835 A1 | 10/2011 | Dodd et al. |
| 2011/0253151 A1 | 10/2011 | Tochigi et al. |
| 2011/0276052 A1 | 11/2011 | Hasselman |
| 2011/0295380 A1 | 12/2011 | Long |
| 2012/0010718 A1 | 1/2012 | Still |
| 2012/0046753 A1 | 2/2012 | Cook et al. |
| 2012/0053591 A1 | 3/2012 | Haines et al. |
| 2012/0053644 A1 | 3/2012 | Landry et al. |
| 2012/0083789 A1 | 4/2012 | Blakemore et al. |
| 2012/0109131 A1 | 5/2012 | Vasarhelyi et al. |
| 2012/0109326 A1 | 5/2012 | Perler |
| 2012/0130376 A1 | 5/2012 | Loring et al. |
| 2012/0136443 A1 | 5/2012 | Wenzel |
| 2012/0185057 A1 | 7/2012 | Abidi et al. |
| 2012/0191210 A1 | 7/2012 | Ratron et al. |
| 2012/0239045 A1 | 9/2012 | Li |
| 2012/0245701 A1 | 9/2012 | Zak et al. |
| 2012/0271314 A1 | 10/2012 | Stemniski et al. |
| 2012/0271430 A1 | 10/2012 | Arnett et al. |
| 2012/0277745 A1 | 11/2012 | Lizee |
| 2013/0041473 A1 | 2/2013 | Rouyer et al. |
| 2013/0116797 A1 | 5/2013 | Coulange et al. |
| 2014/0020690 A1 | 1/2014 | Triplett |
| 2014/0236157 A1 | 8/2014 | Tochigi et al. |
| 2014/0276853 A1 | 9/2014 | Long et al. |
| 2014/0296995 A1 | 10/2014 | Reiley et al. |
| 2014/0309640 A1 | 10/2014 | Smith et al. |
| 2014/0336658 A1 | 11/2014 | Luna et al. |
| 2015/0045801 A1 | 2/2015 | Axelson et al. |
| 2016/0135815 A1 | 5/2016 | Loring et al. |
| 2016/0135857 A1 | 5/2016 | Marrero, Sr. |
| 2016/0361071 A1 | 12/2016 | Mahfouz |
| 2017/0189198 A1 | 7/2017 | Reiley et al. |
| 2018/0177511 A1 | 6/2018 | Luna et al. |
| 2018/0263639 A1 | 9/2018 | McGinley et al. |
| 2019/0053910 A1* | 2/2019 | Sansur ............... A61F 2/30771 |
| 2019/0059917 A1 | 2/2019 | Saltzman |
| 2019/0059918 A1 | 2/2019 | Saltzman et al. |
| 2019/0133612 A1 | 5/2019 | McGinley |
| 2019/0350717 A1 | 11/2019 | Tuttle |
| 2021/0093461 A1* | 4/2021 | Kowalczyk ............ G16H 50/50 |
| 2022/0316504 A1 | 10/2022 | Kubacki |

FOREIGN PATENT DOCUMENTS

| | | |
|---|---|---|
| CN | 106618807 A | 5/2017 |
| CN | 109846580 A | 6/2019 |
| CN | 208974218 U | 6/2019 |
| CN | 108524063 B | 3/2024 |
| EP | 2967697 | 4/2018 |
| EP | 3354233 | 10/2019 |
| GB | 2480846 | 12/2011 |
| JP | H11-500035 | 1/1999 |
| JP | 2006150055 | 6/2006 |
| JP | 2007508123 | 4/2007 |
| JP | 2007518453 | 7/2007 |
| JP | 2007519477 | 7/2007 |
| JP | 2007536011 | 12/2007 |
| JP | 2009148597 | 7/2009 |
| JP | 2011526189 | 10/2011 |
| JP | 2012518517 | 8/2012 |
| JP | 2013500810 | 1/2013 |
| JP | 2013511358 | 4/2013 |
| JP | 5412334 | 2/2014 |
| JP | 2014131738 | 7/2014 |
| WO | WO 9625106 | 8/1996 |
| WO | WO 0166021 A1 | 9/2001 |
| WO | WO 2005011523 A2 | 2/2005 |
| WO | WO 2005037135 | 4/2005 |
| WO | WO 2006022923 | 3/2006 |
| WO | WO 2006023824 | 3/2006 |
| WO | WO 2006099270 | 9/2006 |
| WO | WO 2007084846 | 7/2007 |
| WO | WO 2009143374 | 11/2009 |
| WO | WO 2009158522 | 12/2009 |
| WO | WO 2010099142 | 9/2010 |
| WO | WO 2010135156 | 11/2010 |
| WO | WO 2011015863 | 2/2011 |

(56) References Cited

FOREIGN PATENT DOCUMENTS

| WO | WO 2011063281 | 5/2011 |
|---|---|---|
| WO | WO 2011151657 | 12/2011 |
| WO | WO 2012088036 | 6/2012 |
| WO | WO 2012116089 | 8/2012 |
| WO | WO 2012158917 | 11/2012 |
| WO | WO 2013169475 | 11/2013 |
| WO | WO 2014152535 | 9/2014 |
| WO | WO 2015167581 | 11/2015 |
| WO | WO 2016005722 | 1/2016 |
| WO | WO 2016039762 | 3/2016 |
| WO | WO 2016181168 | 11/2016 |

OTHER PUBLICATIONS

International Search Report for International patent application No. PCT/US2014/027448 dated Jul. 7, 2014.
International Preliminary Report on Patentability issued for International patent application No. PCT/US2014/027448, Sep. 15, 2015, 8 pages.
Partial European Search Report issued in connection with European patent application No. 14768333.8, Oct. 26, 2016, 6 pages.
Patent Examination Report No. 1 issued in connection with Australian patent application No. 2015202080, Jul. 5, 2016, 4 pages.
First Office Action issued for Japanese patent application No. 2016-117842, Sep. 12, 2017, 5 pages.
First Office Action issued in connection with corresponding Japanese Patent Application No. 2020-016447, Apr. 6, 2021, 4 pages.
Office Action in corresponding Canadian Patent Application No. 2,904,652, Jun. 2, 2020, 6 pages.
First Examination Report issued in corresponding Australian Patent Application No. 2019213412, Sep. 3, 2020, 5 pages.
First Office Action in corresponding Canadian Patent Application No. 2,904,652, Jan. 28, 2020, 5 pages.
Final Office Action issued in connection with corresponding Japanese Patent Application No. 206-502443, May 15, 2018, 3 pages.
Extended European Search Report issued in connection with corresponding European Patent Application No. 18160378.8, Jun. 29, 2018, 7 pages.
Second Office Action issued in connection with corresponding Chinese Patent Application No. 2018071101785100, dated Jul. 16, 2016, 6 pages.
First Office Action in corresponding Japanese Patent Application No. 2018-178853, Sep. 3, 2018, 3 pages.
Examination Report No. 1 issued in connection with corresponding Australian Patent Application No. 20182000073, Dec. 24, 2018, 3 pages.
First Office Action issued in connection with corresponding Japanese Patent Application No. 2018-092289, Mar. 5, 2019, 2 pages.
Extended European Search Report and Opinion in connection with European Patent Application No. 14768333.8, dated Jan. 30, 2017, 10 pages.
First Office Action issued in connection with Chinese Patent Application No. 2017800899442 dated Apr. 6, 2022, 8 pages.
International Search Report and Written Opinion issued in connection with International Patent Application No. PCT/US2021/025873, Sep. 2, 2021.
Orthopedic Designs North America, Inc., http://odi-na.com/?service=talon-distalfix-fermoral-nail-system, accessed via Internet, Jul. 22, 2022.
Arthrex, "Arthrex—Intramedullary Nails," https://Www.arthrex.com/foot-ankle/intramedullary-nails, accessed via Internet, Jul. 22, 2022.
Inbone II Total Ankle Surgical Technique, Wright Medical Technology, Inc., Mar. 12, 2014, 64 pages.
Infinity Total Ankle System Surgical Technique, Wright Medical Techology, Inc., Aug. 8, 2015, 76 pages.
First Examination Report issued in connection with Australian Patent Application No. 2020277219, Nov. 19, 2021, 7 pages.
International Search Report and Written Opinion issued in connection with International Patent Application No. PCT/US2016/023729, Feb. 14, 2017, 14 pages.
First Examination Report issued in connection with Australian Patent Application No. 2019246766, Apr. 17, 2020, 9 pages.
Supplementary European Search Report issued in connection with corresponding European Patent Application No. 16895669.6, Oct. 21, 2019, 6 pages.
Office Action in connection with corresponding Canadian Patent Application No. 3,014,284, Jun. 17, 2019, 4 pages.
First Examination issued in connection with Australian Patent Application No. 2016398429, Jan. 21, 2019, 4 pages.
International Search Report and Written Opinion issued in connection with International Patent Application No. PCT/US2021/071308, Dec. 27, 2021, 10 pages.
Extended European Search Report issued in connection with European Patent Application No. 21887801.5, Aug. 22, 2024, 8 pages.

\* cited by examiner

TALAR IMPLANT

CROSS-REFERENCE TO RELATED APPLICATIONS

This application is a National Stage Application, filed under 35 U.S.C. 371, of International Patent Application No. PCT/US2021/071308, filed on Aug. 30, 2021, which claims priority to U.S. Provisional Application No. 63/106,403, filed on Oct. 28, 2020, the entire contents of which are incorporated herein by reference.

FIELD OF DISCLOSURE

Disclosed is a total talar replacement prosthesis.

BACKGROUND

Talar necrosis or talar implant subsidence can leave little to no talar body with no options left for the patient than ankle fusion or amputation. As amputation is not a particularly desirable option, fusion might be preferred by many patients. However, currently available total talar implants do not allow for fusion with either the navicular and/or calcaneus. Therefore, there is a need for a better total talar implant that allow for such fusions.

SUMMARY

Provided is a total talar replacement prosthesis embodiment that comprise a metallic body shell and a metallic or biologic core, where the metallic body shell comprises a removable calcaneus attachment that, when removed, exposes a calcaneus-facing surface. The calcaneus-facing surface can comprise a portion that is a discontinuity in the metallic body shell that exposes the metallic or biologic core that can enable the total talar replacement prosthesis to fuse to a calcaneus bone. In some embodiments, the core can be a solid metal core, a metal cancellous matrix core, a solid biologic core, or a biologic cancellous matrix core. The exposed metal or biologic core can be directly bonded to a calcaneus bone and the cancellous matrix structure can enhance bone ingrowth or on-growth to fuse the prosthesis to the calcaneus bone.

Also provided is a total talar replacement prosthesis embodiment that comprise a metallic body shell and a metallic or biologic core, where the metallic body shell comprises a removable navicular attachment that, when removed, exposes a navicular-facing surface. The navicular-facing surface can comprise a portion that is a discontinuity in the metallic body shell that exposes the metallic or biologic core that can enable the total talar replacement prosthesis to fuse to a navicular bone. In some embodiments, the core can be a solid metal core, a metal cancellous matrix core, a solid biologic core, or a biologic cancellous matric core. The exposed metal or biologic core can be directly bonded to a navicular bone and the cancellous matrix structure can enhance bone ingrowth or on-growth to fuse the prosthesis to the navicular bone.

Also provided is a total talar replacement prosthesis embodiment that comprises a metallic body shell that has both the removable navicular attachment and the removable calcaneus attachment.

DETAILED DESCRIPTION

Figure 1A:
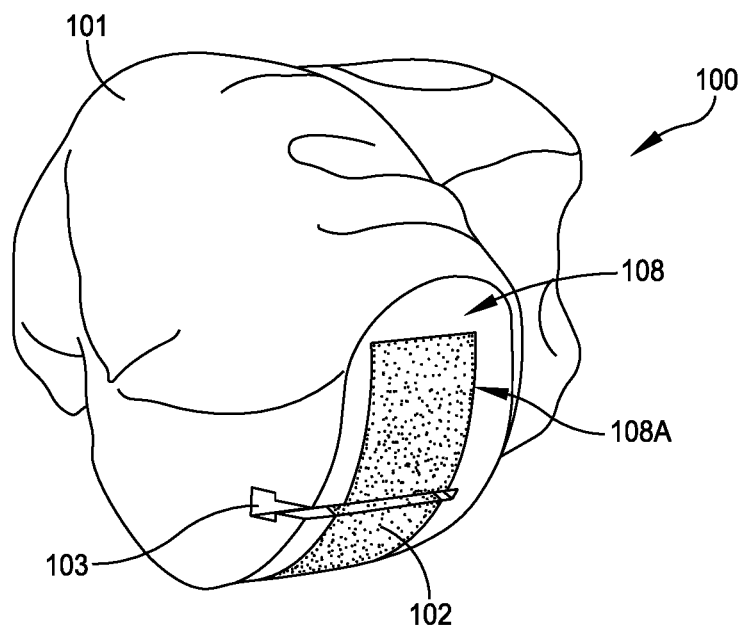
FIG. 1A is an illustration of an embodiment of the total talar replacement prosthesis comprising a navicular-facing surface according to the present disclosure with its navicular attachment component removed.

This description of the exemplary embodiments is intended to be read in connection with the accompanying drawings, which are to be considered part of the entire written description. The drawing figures are not necessarily to scale, and certain features may be shown exaggerated in scale or in somewhat schematic form in the interest of clarity and conciseness. In the description, relative terms such as "horizontal," "vertical," "up," "down," "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. When only a single machine is illustrated, the term "machine" shall also be taken to include any collection of machines that individually or jointly execute a set (or multiple sets) of instructions to perform any one or more of the methodologies discussed herein. The term "operatively connected" is such an attachment, coupling or connection that allows the pertinent structures to operate as intended by virtue of that relationship. In the claims, means-plus-function clauses, if used, are intended to cover the structures described, suggested, or rendered obvious by the written description or drawings for performing the recited function, including not only structural equivalents but also equivalent structures.

Figure 2A:
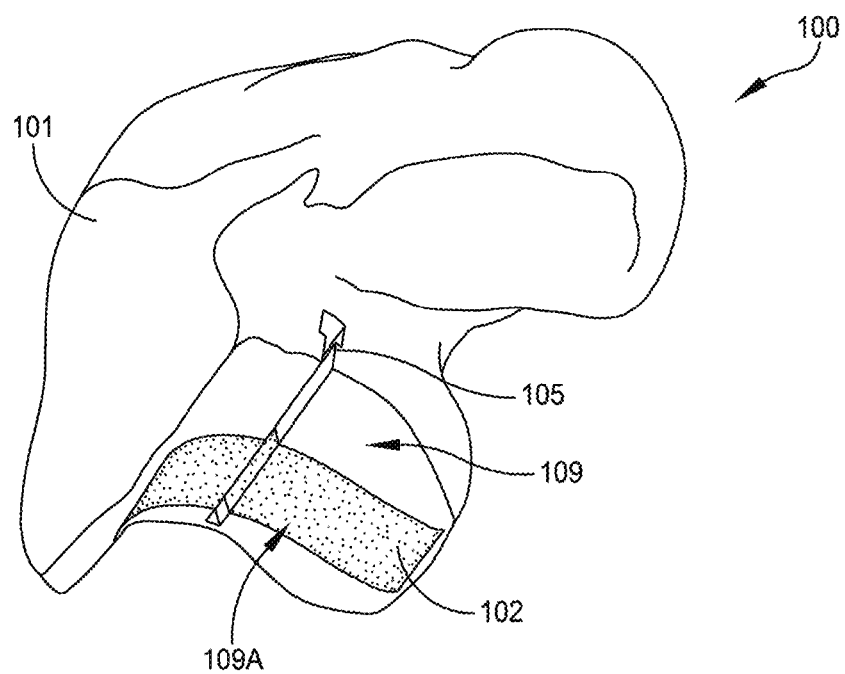
FIG. 2A is an illustration of an embodiment of the total talar replacement prosthesis comprising a calcaneus-facing surface according to the present disclosure with its calcaneus attachment component removed.

Referring to FIGS. 1A and 2A, provided is a total talar replacement prosthesis 100 comprising a metallic body shell 101 and a core 102. The metallic body shell 101 comprises a removable calcaneus attachment 120 that, when removed, exposes a calcaneus-facing surface 109. This feature can be useful when the condition of the patient's ankle is such that fusing the talar replacement prosthesis 100 and the calcaneus is desired. By removing the calcaneus attachment 120 and contacting the calcaneus-facing surface 109 directly against the calcaneus, the appropriate core material can facilitate the talar replacement prosthesis 100 to fuse to the calcaneus. The calcaneus-facing surface 109 comprises a core exposing portion 109A that is a discontinuity in the metallic body shell 101 that exposes the core 102.

Figure 2B:
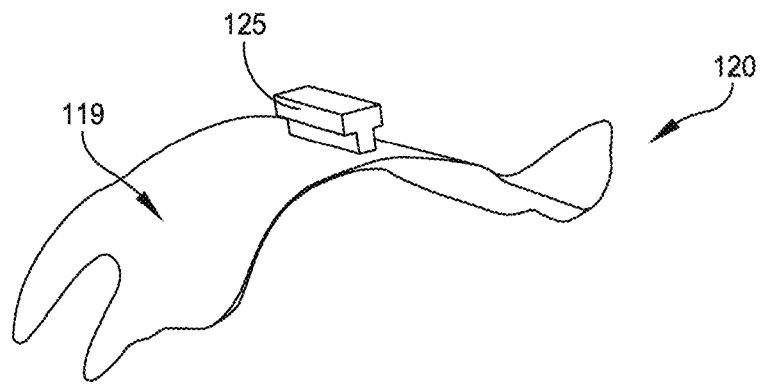
FIG. 2B is an illustration of a calcaneus attachment component of the total talar replacement prosthesis according to the present disclosure.

Referring to FIG. 2B, the calcaneus attachment 120 is configured to be removably attached to the calcaneus-facing surface 109 and cover at least a portion of the exposed core 102 in the exposed core portion 109A. In some embodiments, the calcaneus attachment 120 is sufficiently large to completely cover the exposed core portion 109A.

To removably secure the calcaneus attachment 120 to the calcaneus-facing surface 109, in some embodiments, the calcaneus-facing surface 109 comprises a first attachment feature and the calcaneus attachment 120 comprises a corresponding mating attachment feature 125. In the illustrated example shown in FIG. 2B, the first attachment feature is a groove 105 and the mating attachment feature is a rail portion 125 that is configured to engage the groove on the calcaneus-facing surface by sliding. In some embodiments, the first attachment feature and the mating attachment feature are configured to engage each other by threading or clipping/snapping.

Figure 1B:
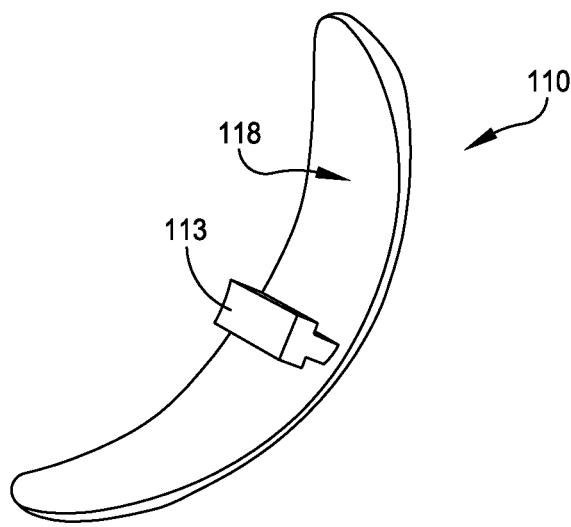
FIG. 1B is an illustration of a navicular attachment component of the total talar replacement prosthesis according to the present disclosure.

As shown in FIGS. 1A and 1B, the metallic body shell 101 of the total talar replacement prosthesis 100 also comprises a removable navicular attachment 110 that, when removed, exposes a navicular-facing surface 108. This feature can be useful when the condition of the patient's ankle is such that fusing the talar replacement prosthesis 100 and the navicular is desired. By removing the navicular attachment 110 and contacting the navicular-facing surface 108 directly against the navicular, the appropriate core material can facilitate the talar replacement prosthesis 100 to fuse to the navicular. The navicular-facing surface 108 comprises a core exposing portion 108A that is a discontinuity in metallic body shell 101 that exposes the core 102.

Referring to FIG. 1B, the navicular attachment 110 is configured to be removably attached to the navicular-facing surface 108 and cover at least a portion of the exposed core 102 in the exposed core portion 108A. In some embodiments, the navicular attachment 110 is sufficiently large to completely cover the exposed core portion 108A.

To removably secure the navicular attachment 110 to the navicular-facing surface 108, in some embodiments, the navicular-facing surface 108 comprises a first attachment feature and the navicular attachment 110 comprises a corresponding mating attachment feature 113. In the illustrated example shown in FIG. 1B, the first attachment feature is a groove 103 and the mating attachment feature is a rail portion 113 that is configured to engage the groove on the navicular-facing surface by sliding.

Figure 6:
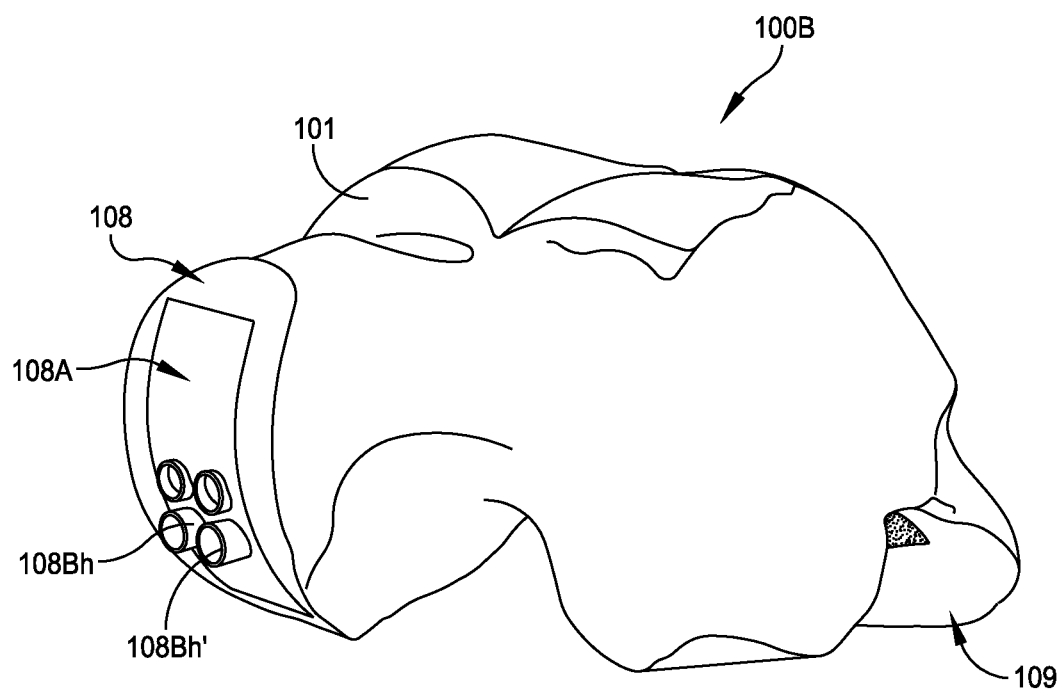
Figure 6:
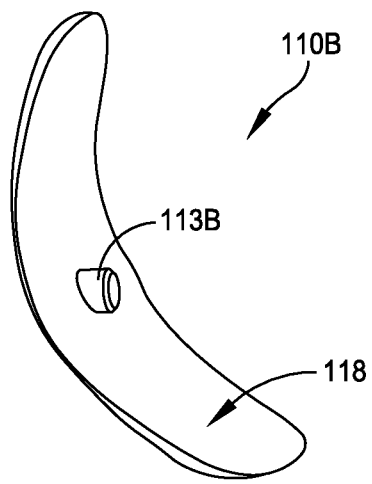
Figure 7:
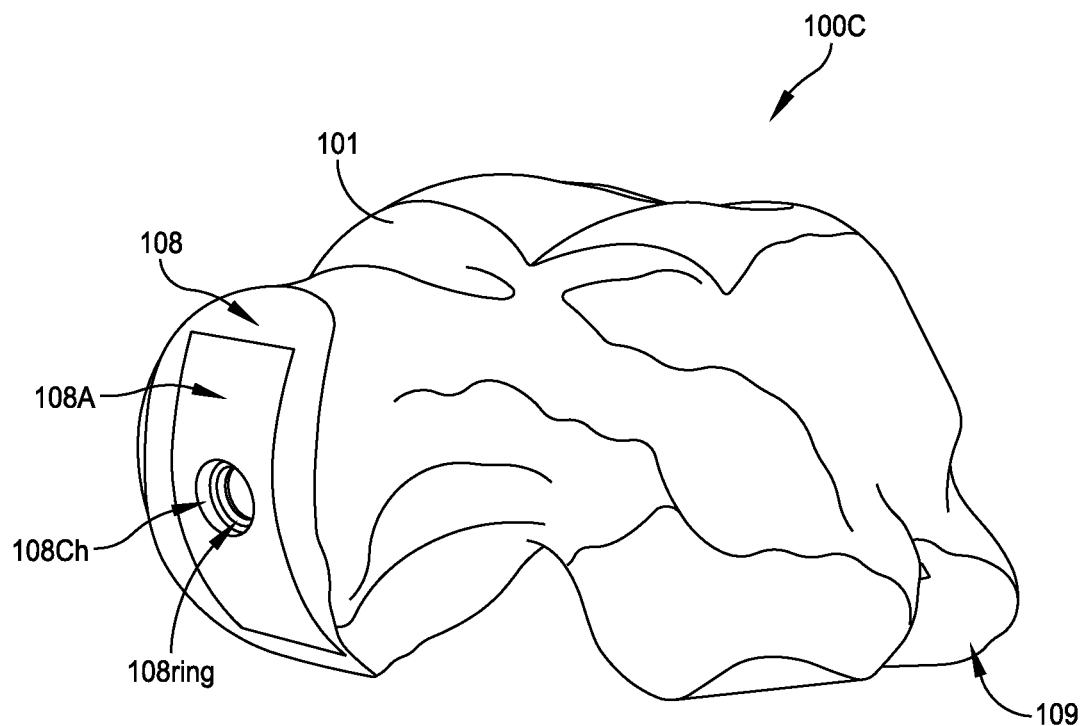
Figure 7:
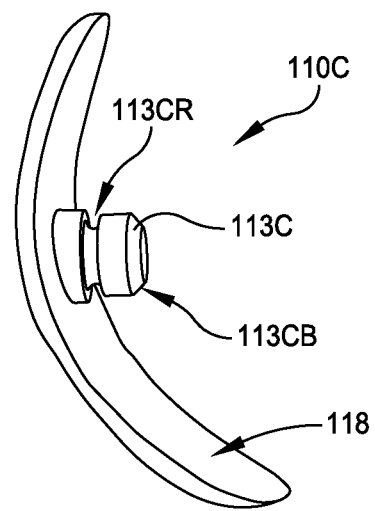

In some embodiments, the first attachment feature and the mating attachment feature are configured to engage each other by threading or clipping/snapping. Referring to FIGS. 6 and 7, examples of embodiments of total talar replacement prosthesis utilizing such first attachment feature and corresponding mating attachment feature are disclosed. In the examples shown in FIGS. 6 and 7, a navicular-facing surface and navicular attachment examples are used to illustrate such attachment configurations. FIG. 6 shows a total talar replacement prosthesis 100B comprising a navicular facing surface 108 comprising an exposed core portion 108A and a corresponding navicular attachment 110B that can be removably attached to the exposed core portion 108A. The removable attachment is achieved by a snap-fitting attachment feature. Provided in the exposed core portion 108A are a plurality of cylindrical structures 108Bh as the first attachment feature. Provided in the navicular attachment 110B is at least one stud 113B that is the mating attachment feature configured to snap-fit into the first attachment feature, the plurality of cylindrical structures 108Bh. When the navicular attachment 110B is properly aligned with the exposed core portion 108A, the at least one stud 113B snap-fits in the geometric center of the plurality of cylindrical structures 108Bh. Each of the plurality of cylindrical structures 108Bh can also comprise a ridge 108Bh' provided along the perimeter of the cylindrical structure for enabling the snap-fitting engagement. FIG. 7 shows a total talar replacement prosthesis 100C comprising a navicular-facing surface 108 comprising an exposed core portion 108A and a corresponding navicular attachment 110C that can be removably attached to the exposed core portion 108A. Provided in the exposed core portion 108A is at least one hole 108Ch as the first attachment feature. Provided in the navicular attachment 110C is at least one pin 113C that is the mating attachment feature configured to snap-fit into the at least one hole 108Ch, first attachment feature. In the example shown, the at least one hole 108Ch is configured with a retaining ring 108*ring* and the at least one pin 113C is configured with a beveled leading edge 113CB and an annular groove 113CR at a set distance from the beveled leading edge 113CB. The retaining ring 118*ring* has an inner diameter that is smaller than the outer diameter of the at least one pin 113C. When the at least one pin 113C is inserted into the at least one hole 108Ch, the beveled leading edge 113CB elastically expands the retaining ring 108*ring* and advances into the at least one hole 108Ch. Once the at least one pin 113C advances sufficient depth into the hole 108Ch, the annular groove 113CR reaches the retaining ring 108*ring* and the retaining ring 108*ring* contracts back into its initial diameter and engages the annular groove 113CR, thus retaining the navicular attachment 110C in place.

Figure 3:
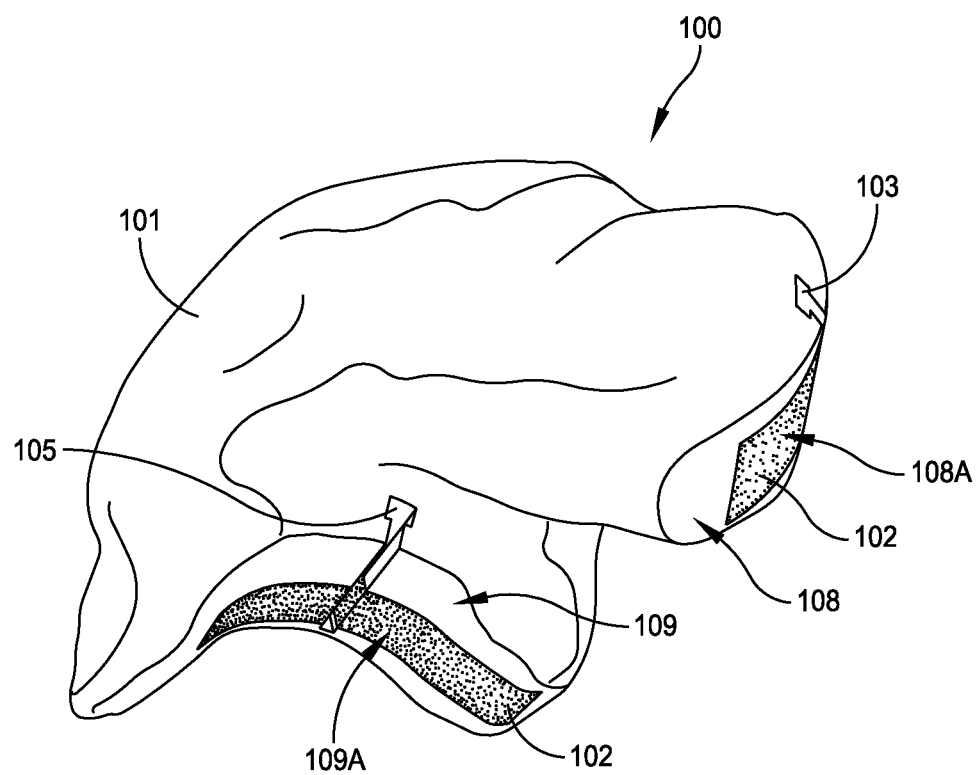
FIG. 3 is an illustration of another embodiment of the total talar replacement prosthesis according to the present disclosure with both the navicular attachment component and the calcaneus attachment component removed.
Figure 4:
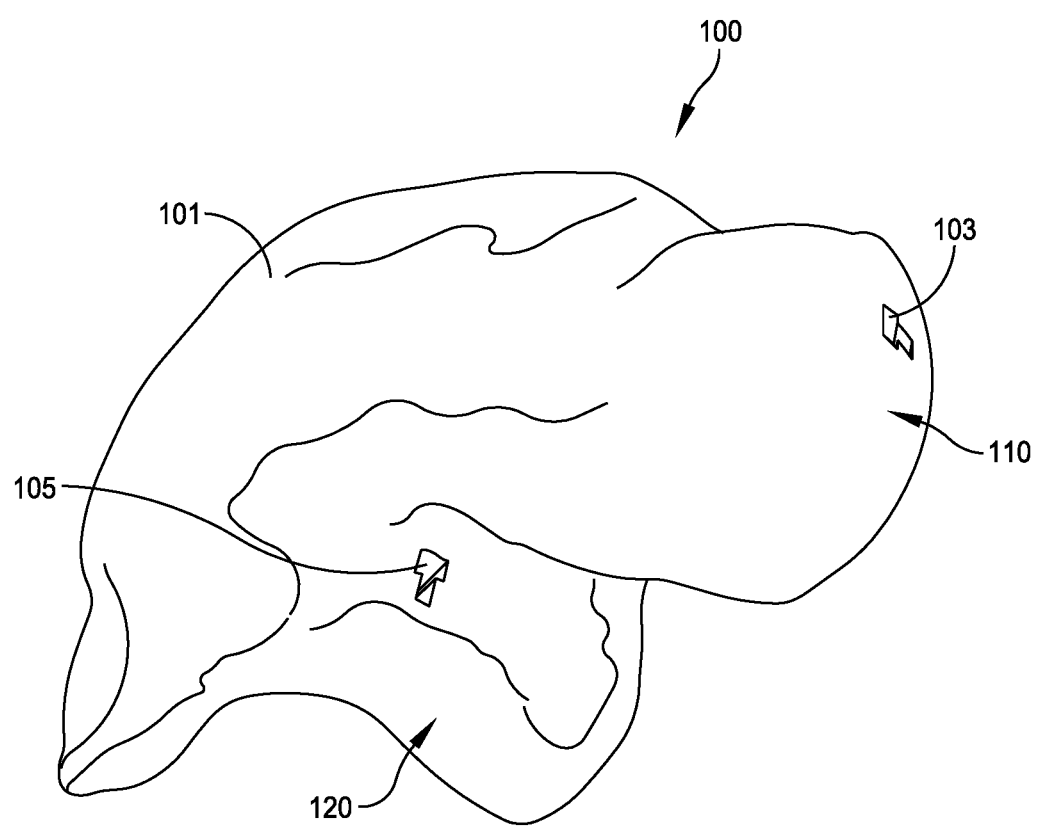
FIG. 4 is an illustration of a total talar replacement prosthesis of FIG. 1A, FIG. 2A, or FIG. 3, with their navicular attachment and/or calcaneus attachment components in place.

Referring to FIG. 3, in some embodiments, the total talar replacement prosthesis 100 can be configured to have both the navicular-facing surface 108 and the calcaneus-facing surface 109 and the corresponding navicular attachment 110 and the calcaneus attachment 120. Such embodiment can be used in situations where fusing the talar replacement prosthesis 100 to both the calcaneus and navicular is desired. The various options for enhancing or facilitating the fusion between the talar replacement prosthesis 100 and the calcaneus and the navicular described above are also applicable to this embodiment.

Figure 5:
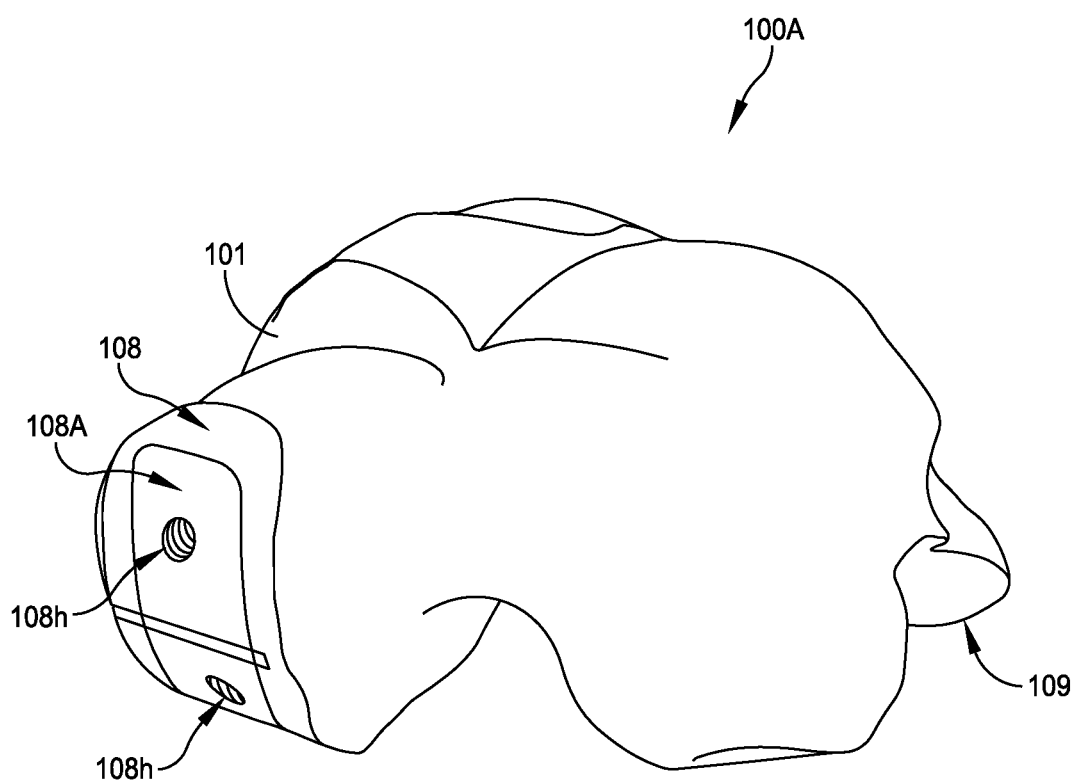
FIGS. 5-7 are illustrations of additional embodiments of the total talar replacement prosthesis according to the present disclosure.

According to an aspect of the present disclosure, the core 102 can be a solid metal core where the core is of the same metal as the metallic body shell 101 or the core is of a different material as the metallic body shell 101, such as a resorbable metal, a soft metal, or a biologic material. In some embodiments, the core 102 can have a cancellous matrix formed of a porous metallic material such as Wright Medical Technology's ADAPTIS™. or of a porous biologic material such as Wright Medical Technology's ALLOPURE™. Whether the core 102 is a solid core or a cancellous matrix core, the exposed core portions 108A and/or 109A can be provided with threaded features imbedded therein to allow compression for fusion with their respective navicular bone or calcaneus bone. FIG. 5 shows an example of a total talar replacement prosthesis 100 in which the exposed core portion 108A on the navicular-facing surface 108 is provided with at least one threaded blind hole 108h. The at least one threaded blind hole 108h would allow insertion of at least one bone screw through the navicular and/or calcaneus bone and into the total talar replacement prosthesis.

In embodiments where the core 102 is a cancellous matrix core, the exposed core portions 108A and/or 109A can be directly bonded to a navicular and/or calcaneus bone, respectively, and the cancellous matrix structure can enhance bone ingrowth or on-growth and help fuse the prosthesis to the navicular and/or calcaneus bone.

Figure 8:
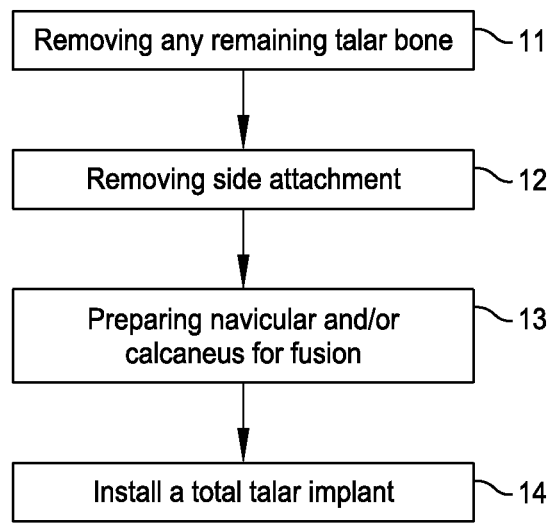
FIG. 8 is a flowchart of an example of a method for installing the total talar replacement prosthesis of the present disclosure.

Referring to the flowchart 10 in FIG. 8, an example of a method for implanting the total talar replacement prosthesis 100 of the present disclosure is disclosed. The method can include removing any remaining talar bone from the patient's ankle (step 11); removing side attachment for either a talo-navicular fusion and/or talo-calcaneus fusion (step 12); preparing navicular and/or calcaneus for fusion (step 13); and installing the total talar implant 100 (step 14) of the present disclosure.

Although the devices, kits, systems, and methods have been described in terms of exemplary embodiments, they are not limited thereto. Rather, the appended claims should be construed broadly, to include other variants and embodiments of the devices, kits, systems, and methods, which may be made by those skilled in the art without departing from the scope and range of equivalents of the devices, kits, systems, and methods.

I claim:

1. A total talar replacement prosthesis comprising:
a metallic body shell that partially encloses a core wherein the metallic body shell includes a calcaneus-facing surface a portion of which defines a discontinuity that exposes the core; and
a calcaneus attachment configured to:
(i) be removably attached to the calcaneus-facing surface; and
(ii) removably cover at least a portion of the exposed core by at least partially filling the discontinuity of the metallic body shell, wherein the core is a metallic or biologic cancellous matrix core.

2. The total talar replacement prosthesis of claim 1, wherein the portion of the cancellous matrix core exposed in the calcaneus-facing surface of the shell is configured with one or more imbedded threaded features that allow compression for fusion with a calcaneus bone.

3. The total talar replacement prosthesis of claim 1, wherein the calcaneus-facing surface comprises a first attachment feature and the calcaneus attachment comprises a mating attachment feature that is configured to engage the first attachment feature on the calcaneus-facing surface.

4. The total talar replacement prosthesis of claim 3, wherein the mating attachment feature is configured to engage the first attachment feature by sliding, threading, or clipping/snapping.

5. The total talar replacement prosthesis of claim 1, wherein the calcaneus attachment is sufficiently large to completely cover the exposed core portion of the calcaneus-facing surface.

6. A total talar replacement prosthesis comprising:
a metallic body shell that partially encloses a core wherein the metallic body shell includes a navicular-facing surface a portion of which defines a discontinuity that exposes the core; and
a navicular attachment configured to be removably attached to the navicular-facing surface and to removably cover at least a portion of the discontinuity so as to expose at least a exposed core by at least partially filling the discontinuity of the metallic body shell wherein the core is a metallic or biologic cancellous matrix core.

7. The total talar replacement prosthesis of claim 6, wherein the portion of the cancellous matrix core exposed in the navicular-facing surface of the shell is configured with one or more imbedded threaded features that allow compression for fusion with a navicular bone.

8. The total talar replacement prosthesis of claim 6, wherein the navicular-facing surface comprises a first attachment feature and the navicular attachment comprises a mating attachment feature that is configured to engage the first attachment feature on the navicular-facing surface.

9. The total talar replacement prosthesis of claim 6, wherein the navicular attachment is sufficiently large to completely cover the exposed core portion of the navicular-facing surface.

10. The total talar replacement prosthesis of claim 6, wherein the mating attachment feature is configured to engage the first attachment feature by sliding, threading, or clipping/snapping.

11. A total talar replacement prosthesis comprising:
a metallic body shell that partially encloses a core wherein the metallic body shell includes:
a navicular-facing surface a portion of which defines a discontinuity that exposes the core; and
a calcaneus-facing surface a portion of which defines a discontinuity that exposes the core;
a navicular attachment configured to be removably attached to the navicular-facing surface and to removably cover at least a portion of the exposed core by at least partially filling the discontinuity of the metallic body shell; and
a calcaneus attachment configured to be removably attached to the calcaneus-facing surface and to removably cover at least a portion of the exposed core by at least partially filling the discontinuity of the metallic body shell wherein the core is a metallic or biologic cancellous matrix core.

12. The total talar replacement prosthesis of claim 11, wherein the cancellous matrix core exposed in the calcaneus-facing surface discontinuity is configured with one or more imbedded threaded features that allow compression for fusion with a calcaneus bone.

13. The total talar replacement prosthesis of claim 11, wherein the cancellous matrix core exposed in the navicular-facing surface discontinuity is configured with one or more imbedded threaded features that allow compression for fusion with a navicular bone.

14. The total talar replacement prosthesis of claim 11, wherein the navicular-facing surface comprises a first attachment feature and the navicular attachment comprises a mating attachment feature that is configured to engage the first attachment feature on the navicular-facing surface.

15. The total talar replacement prosthesis of claim 14, wherein the mating attachment feature is configured to engage the first attachment feature by sliding, threading, or clipping/snapping.

16. The total talar replacement prosthesis of claim 11, wherein the calcaneus-facing surface comprises a first attachment feature and the calcaneus attachment comprises a mating attachment feature that is configured to engage the first attachment feature on the calcaneus-facing surface.

17. The total talar replacement prosthesis of claim 16, wherein the mating attachment feature is configured to engage the first attachment feature by sliding, threading, or clipping/snapping.

18. The total talar replacement prosthesis of claim 16, wherein the navicular-facing surface comprises a first attachment feature and the navicular attachment comprises a mating attachment feature that is configured to engage the first attachment feature on the navicular-facing surface.

19. The total talar replacement prosthesis of claim 11, wherein the navicular attachment is sufficiently large to completely cover the exposed core portion of the navicular-facing surface.

20. The total talar replacement prosthesis of claim 11, wherein the calcaneus attachment is sufficiently large to completely cover the exposed core portion of the calcaneus-facing surface.

\* \* \* \* \*